United States Patent
Mylly et al.

(10) Patent No.: US 7,441,053 B2
(45) Date of Patent: Oct. 21, 2008

(54) SUPPORT OF AN INTERACTION BETWEEN A HOST DEVICE AND A PERIPHERAL DEVICE

(75) Inventors: Kimmo Mylly, Julkujärvi (FI); Jani Hyvönen, Tampere (FI); Marko T. Ahvenainen, Ruutana (FI)

(73) Assignee: Nokia Corporation, Espoo (FI)

( * ) Notice: Subject to any disclaimer, the term of this patent is extended or adjusted under 35 U.S.C. 154(b) by 367 days.

(21) Appl. No.: 10/737,191

(22) Filed: Dec. 15, 2003

(65) Prior Publication Data

US 2005/0132092 A1    Jun. 16, 2005

(51) Int. Cl.
*G06F 3/00* (2006.01)
*G06F 9/00* (2006.01)

(52) U.S. Cl. .................. 710/10; 710/1; 710/15; 710/17; 713/1

(58) Field of Classification Search ........... 710/1, 710/15, 17; 713/1
See application file for complete search history.

(56) References Cited

U.S. PATENT DOCUMENTS

| | | | | |
|---|---|---|---|---|
| 4,638,428 A | | 1/1987 | Gemma et al. ............. 364/200 |
| 5,081,577 A | | 1/1992 | Hatle et al. ................ 364/200 |
| 5,424,903 A | * | 6/1995 | Schreiber .................. 361/166 |
| 5,566,351 A | * | 10/1996 | Crittenden et al. ......... 710/46 |
| 5,701,514 A | * | 12/1997 | Keener et al. ............. 710/14 |
| 6,233,625 B1 | * | 5/2001 | Vander Kamp et al. ..... 710/10 |
| 6,964,018 B1 | * | 11/2005 | Masui ........................ 715/530 |
| 2003/0212857 A1 | * | 11/2003 | Pacheco et al. ............ 711/114 |

FOREIGN PATENT DOCUMENTS

EP    0 689 144    12/1995

OTHER PUBLICATIONS

MMCA Technical Committee; The MultiMediaCard System Specification; May 2003; Version 3.31; pp. 11, 53-55, 67, 81.*
"The MultiMedia Card", System Specification, MMMCA Technical Committee, Version 3.31.

* cited by examiner

*Primary Examiner*—Alford W Kindred
*Assistant Examiner*—Richard Franklin
(74) *Attorney, Agent, or Firm*—Ware, Fressola, Van Der Sluys & Adolphson, LLP (57) ABSTRACT

The invention relates to a method for use in a system comprising a host device and at least one peripheral device which are enabled to interact with each other. In order to improve the flexibility of the system, the method comprises a step of transmitting information indicative of a time required for an initialization of the at least one peripheral device from the at least one peripheral device to the host device, and a step of evaluating in the host device the information indicative of a time required by the at least one peripheral device for an initialization. The invention relates equally to a corresponding host device, to a corresponding peripheral device, to a corresponding system and to corresponding software program products.

16 Claims, 4 Drawing Sheets

Fig. 1

Conventional OCR:

| Bits | Voltage Window | High Voltage MMC | Dual Voltage MMC |
|---|---|---|---|
| [6:0] | Reserved | 0000000b | 0000000b |
| [7] | 1.65-1.95V | 0b | 1b |
| [14:8] | 2.0V-2.6V | 0000000b | 0000000b |
| [23:15] | 2.7V-3.6V | 111111111b | 111111111b |
| [30:24] | Reserved | 0000000b | 0000000b |
| [31] | Busy | 0b Busy<br>1b Ready | 0b Busy<br>1b Ready |

Fig. 2 (Prior art)

Proposed OCR:

| Bits | Voltage Window | High Voltage MMC | Dual Voltage MMC |
|---|---|---|---|
| [6:0] | Reserved | 0000000b | 0000000b |
| [7] | 1.65-1.95V | 0b | 1b |
| [14:8] | 2.0V-2.6V | 0000000b | 0000000b |
| [23:15] | 2.7V-3.6V | 111111111b | 111111111b |
| [30:24] | Timeout Value | xxxxxxxb | xxxxxxxb |
| [31] | Busy | 0b Busy<br>1b Ready | 0b Busy<br>1b Ready |

SUPPORT OF AN INTERACTION BETWEEN A HOST DEVICE AND A PERIPHERAL DEVICE

FIELD OF THE INVENTION

The invention relates to a method for use in a system comprising a host device and at least one peripheral device which are enabled to interact with each other. The invention relates equally to such a host device, to such a peripheral device and to such a system. The invention further relates to software program products for use in such a system.

BACKGROUND OF THE INVENTION

A host device may enable an interaction with a peripheral device, thereby allowing an application of the host device to access additional functions provided by the peripheral device. The host device can be for example a mobile terminal, while the peripheral device can be for example a memory card.

The peripheral device has to be powered up and initialized before it is able to offer its function to a host device. The host device thus has to know when the peripheral device is in a ready state, before it can start to make use of the peripheral device. The time between the start of an initialization and the ready state of a peripheral device is also referred to as timeout.

In one possible approach, the host device polls the peripheral device, until the peripheral device responds that it is in a ready state.

A system in which such a polling is employed is the MultiMediaCard (MMC) system defined in the MultiMediaCard Association (MMCA) standard version 3.3.1.

This standard defines a system which allows a plurality of MultiMediaCards to connect as peripheral devices via an MMC bus to a multimedia application implemented in a host device. Each MultiMediaCard can be a Read Only Memory (ROM) card, a Read/Write (RW) card or an I/O card.

A MultiMediaCard is connected via seven pins to a respective line of the MMC bus. Three pins enable a voltage supply to the card, one pin CMD enables an exchange of commands and responses, one pin DAT enables a data exchange and one pin CLK a supply of a clock signal. The last pin is reserved for future use.

The pins CMD, CLK and DAT are connected within the MultiMediaCard via an interface driver to a card interface controller. The card interface controller has access to a memory core via a memory core interface and in addition to a plurality of registers. The registers include a Card IDentification (CID) register comprising a Card Identification number and an Operation Conditions Register (OCR). The latter is used by a special broadcast command to identify the voltage range supported by the card.

The host device comprises in addition to or combined with the multimedia application an MMC controller, via which the application is connected to the MMC bus. The MMC controller serves as a bus master for the MMC bus.

A host device may reset all connected cards by switching the power supply on the MMC bus off and back on. In addition, an explicit reset signal CMD0 can be used by the host device for resetting a card. When connected cards have been reset in one or the other way, the host device must start an initialization sequence in all cards connected to the MMC bus by a command CMD1. The time which each of the connected MultiMediaCards requires at the most between a command to initialize and a ready state in which a card is ready to receive a new command is specific to the technology of the respective card and might also be dependent on power consumption restrictions.

As the host device cannot be sure when the media has completed the initialization, a polling is used by the host device, in order to check whether a card has entered the ready state. The polling is carried out by transmitting the CMD1 command repeatedly. Each CMD1 command is responded to by the MultiMediaCard with an R3 response, including data on an operating voltage range and in addition a busy bit indicating whether the card has entered a ready state. Both pieces of information are retrieved by the card interface controller of the MultiMediaCard from the OCR.

In case of errors in the functionality of a peripheral device like a MultiMediaCard, however, such a polling results in an infinite loop.

In order to overcome this problem, a fixed time can be selected as the maximum time within which peripheral devices should be required to enter a ready state. The host device will then assume for any type of peripheral device that it has to wait at the most this fixed time before the peripheral device enters the ready state in an error free situation. If the ready state is not entered within the fixed time, the polling is interrupted. In the case of an MMCA system, the fixed time would be the maximum time between the first sent CMD1 command and the time at which a card is ready for receiving the next command.

For the polling frequency, then two alternatives can be considered.

In the first alternative, a rather low polling frequency is employed, for example a polling once each 200 ms in case of an assumed fixed time of one second. Since the ready state might be achieved in the worst case indeed only at the end of the fixed time, this alternative saves computational power at the host device compared to a more frequent polling. It has the disadvantage, though, that if a short response time is required and some peripheral device could even achieve it, valuable time is lost by the low polling frequency.

In the second alternative, a rather high polling frequency is employed despite of the worst case in which a ready state is achieved only at the end of the fixed time. This alternative has the advantage that peripheral devices having a short initialization time can be handled quickly. With peripheral devices having a long initialization time, however, the host device is burdened unnecessarily by the frequent polling.

Further, the fixed time has to be selected to work for all currently known peripheral devices employing certain technologies. Some slower technologies which are currently not yet employed in peripheral devices might have a significantly longer initialization time than allowed by the fixed time. As a consequence, new peripheral devices employing such technologies cannot be used without special arrangements.

In MMC systems, for example, currently MultiMediaCards are employed which all require a maximum of one second for entering the ready state, which makes a fixed time of one second appropriate. These MultiMediaCards include for instance flash memories. It could now be considered to use as well a hard disc in MultiMediaCard format as new type of peripheral device in an MMC system. A hard disc, however, would require a significantly longer initialization time. A hard disc in MultiMediaCard format would thus have to use for instance register data stored into another place than the actual mass memory.

It has to be noted that while problems have been described specifically with reference to an MMC system, similar problems might occur in various other systems in which a host device has to known when a connected peripheral device is ready for operation.

SUMMARY OF THE INVENTION

It is an object of the invention to provide a more flexible access of a host device to a peripheral device.

A method is proposed for use in a system comprising a host device and at least one peripheral device which are enabled to interact with each other. The proposed method comprises as a first step transmitting information indicative of a time required for an initialization of the at least one peripheral device from the at least one peripheral device to the host device. The proposed method comprises as a second step evaluating in the host device the information indicative of the time required by the at least one peripheral device for an initialization.

Moreover, a host device is proposed, which comprises an interface for interacting with at least one peripheral device, and a control component for receiving from at least one peripheral device via the interface an information indicative of a time required at the at least one peripheral device for an initialization. The control component evaluates in addition a received information indicative of a time required at at least one peripheral device for an initialization.

Moreover, a peripheral device is proposed, which comprises an interface for interacting with a host device and a storing component storing information indicative of a time required at the peripheral device for a respective initialization. The proposed peripheral device comprises in addition a controlling component for retrieving information indicative of a time required at the peripheral device for a respective initialization from the storing component and for transmitting the information via the interface to a host device.

Further, a system is proposed which comprises the proposed host device and the proposed peripheral device. It has to be noted that such a system may comprise as well a plurality of peripheral devices.

Finally, two software program products are proposed, in which a software code for use in a system comprising a host device and at least one peripheral device which are enabled to interact with each other is stored.

The software code of the first proposed software program product is to be run in a processing unit of the host device. In this case, it realizes a first step of receiving information indicative of a time required by the at least one peripheral device for an initialization and a second step of evaluating the information indicative of a time required by the at least one peripheral device for an initialization.

The software code of the second proposed software program product is to be run in a processing unit of a peripheral device. In this case, it realizes a first step of retrieving information indicative of a time required for an initialization of the peripheral device from a storage component, and a second step of causing a transmission of information indicative of a time required for an initialization of the peripheral device to the host device.

The invention proceeds from the consideration that a fixed maximum timeout, which is assumed by a host device for any peripheral device, might be on the one hand unnecessarily long for some technologies and on the other hand too short for some other technologies. It is therefore proposed that the peripheral device indicates the time required specifically for its own initialization to the host device, which indication can then be evaluated by the host device. The indicated initialization time can be in particular, though not exclusively, the initialization time which is required at the most by the peripheral device, that is, its individual maximum timeout.

It is an advantage of the invention that it adds flexibility to the system. The invention allows in particular to have a common access to peripheral devices using different technologies with considerably different initialization times. For example, it allows to connect conventional MultiMediaCards as well a hard disc in card form to an MMC bus, which is used by a host device for accessing various peripheral devices.

The transmitted information indicative of the time of initialization of a peripheral device can be given by information representing the initialization time directly. That is, specific information on an initialization time is associated to a specific initialization time, for example by simple calculations transforming the initialization time into a suitable format for transmission. Alternatively, the information indicative of the time of initialization may also represent the initialization time indirectly. The information could be for example an information on the employed technology type of the peripheral device, if different initialization times are required for different technologies.

In one embodiment of the invention, the peripheral device transmits the information indicative of the initialization time upon a predetermined command received from the host device. The predetermined command can be either a command which is transmitted anyhow to the peripheral device, for example a command requesting an initialization, or a dedicated, separate command.

In a further embodiment of the invention, the host device evaluates the received information specifically for adapting a polling frequency which is to be employed for polling the peripheral device on whether the peripheral device has completed an initialization. In this embodiment, the invention allows optimization of the polling frequency for different technologies, since the host device can adapt the polling frequency for each peripheral device depending on the individual initialization time of the respective peripheral device. This ensures on the one hand that a request is dealt with as fast as possible and on the other hand that an unnecessary extra load to the system is avoided, since there is no need for unnecessary polling.

A further embodiment of the invention takes care of a situation in which a system comprises several peripheral devices which are to interact with the host device. A host device will usually deal with all peripheral devices in common in an initialization phase, thus it has to be ensured that the evaluated time required for an initialization is valid for all connected peripheral devices. Therefore, the information by each peripheral device indicating the time which it requires at the most for its initialization is combined to an information indicating a time which is required at the most by any of the peripheral devices for its respective initialization. The host device can then evaluate the combined information.

In further embodiment of the invention, the proposed system is a MultiMediaCard system defined in the above cited MMCA standard and the proposed devices are devices of such a system.

In one embodiment of the invention which is based on the MMCA standard, the peripheral device transmits the information indicative of the initialization time upon receiving a CMD1 command from the host device. As the CMD1 command is the first actual command defined in the MMCA standard, which can only be preceded by the reset command CMD0, this is the only command in an MMCA system which can be used for requesting the information without introducing a separate command. A MultiMediaCard responds to a CMD1 command with an R3 response. Currently, the R3 response includes data on the operating voltage range of the card, which is retrieved from the OCR. Since there is a reserved part in the OCR, the reserved bits could be used advantageously for storing the desired information indicative of an initialization time. The information indicative of an initialization time can then be transmitted together with the data on the operating voltage range in the R3 response to the host device.

Transmitting the information indicative of the initialization time in the R3 response allows a backwards compatibility for conventional host devices or conventional peripheral devices. If a default value is transmitted in the R3 response instead of an information indicative of an initialization time by a conventional peripheral device, the host device can simply make use of some predefined fixed timeout value as before. Equally, if information indicative of an initialization time is transmitted by a peripheral device in the R3 response but a host device is not adapted to evaluate this information, the host device will simply ignore the information and make use of some predefined fixed timeout value as before. A similar backward compatibility can be achieved in any other system in which a conventional message is used for transmitting in addition the information indicative of an initialization time at a position which is conventionally ignored at the host device.

In another embodiment of the invention employed in an MMCA system, the information on an initialization time can also be transmitted using a data line of the MMC bus, instead of a command line.

The invention in general can be employed for various types of host devices and peripheral devices. The host device can be for instance a mobile terminal, a Personal Digital Assistant (PDA), a camera, etc. The peripheral device can be for instance a memory card, but equally a printer, a hard disk connected to an MMC bus, etc.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
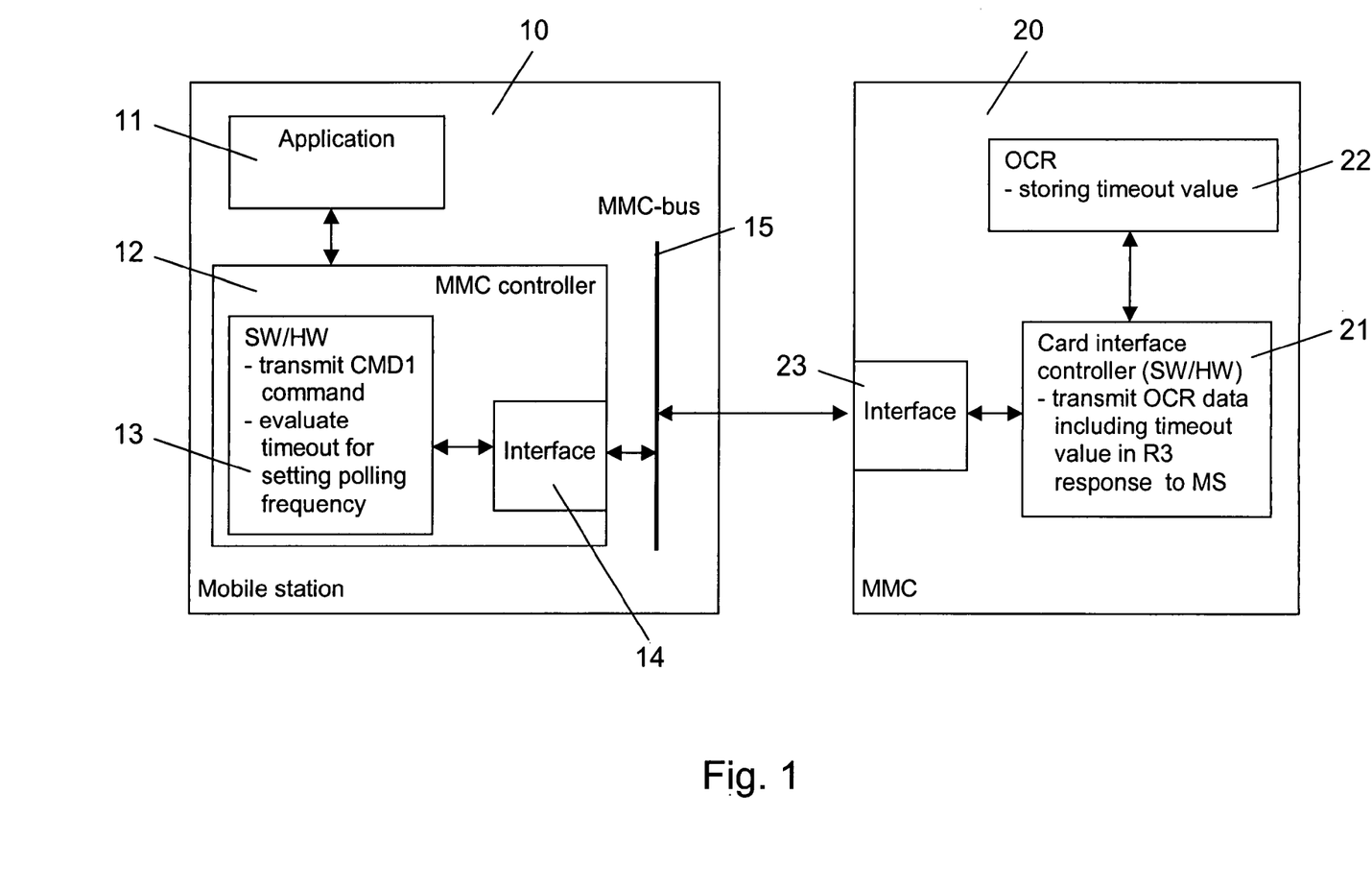
FIG. 1 is a schematic block diagram of an embodiment of a system according to the invention.

FIG. 1 schematically presents an exemplary system according to the invention.

The system comprising a mobile station MS 10 as host device and a MultiMediaCard MMC 20 as peripheral device.

The mobile station 10 comprises an application 11, which may exchange data with the MultiMediaCard 20. The application 11 is connected to an MMC controller 12. The MMC controller 12 comprises a software SW running in a processing component of the mobile station 10 and/or a hardware HW 13, which is connected via an MMC bus interface 14 of the MMC controller 12 to an MMC bus 15. In addition, the mobile terminal 10 may comprise any other components known from the state of the art to be employed in mobile terminals.

The design of the MultiMediaCard 20 is basically the same as defined in the above mentioned MMCA standard. For the sake of clarity, therefore only a card interface controller 21 and an Operation Conditions Register (OCR) 22 and in interface 23 of the MultiMediaCard 20 are shown in FIG. 1. The OCR 22 is connected via the card interface controller 21 and the interface 23 to the MultiMediaCard bus 15 of the mobile station 10. The functions of the card interface controller 21 may be realized by a software SW running in a processing component of the MultiMediaCard 20 and/or in hardware HW.

The presented MultiMediaCard 20 differs from a conventional MultiMediaCard only in the entries in the OCR 22. The OCR 22 of the presented MultiMediaCard 20 stores more specifically in addition a timeout value defining the maximum time it should take the MultiMediaCard 20 to complete an initialization after a corresponding request by a host device.

Figure 2:
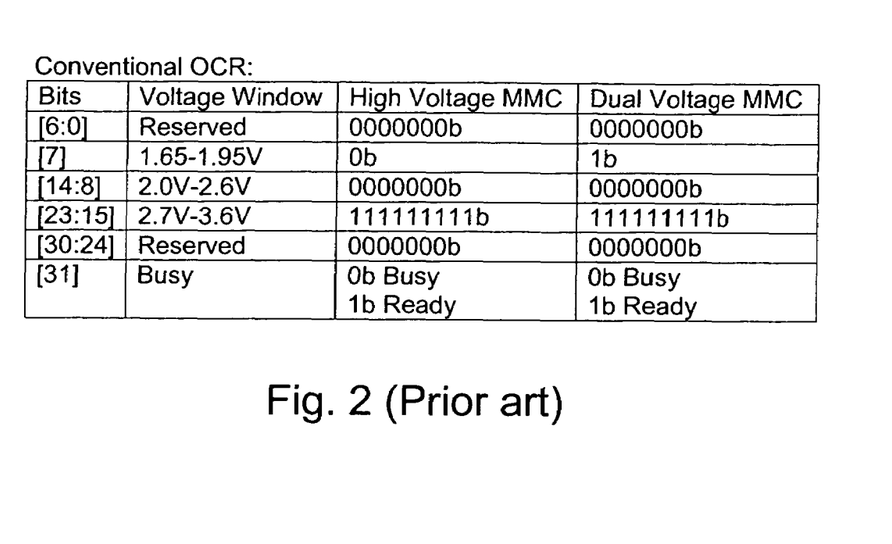
FIG. 2 is a table presenting the current OCR defined for MultiMediaCards.

FIG. 2 is a table illustrating the entries in a conventional OCR of a MultiMediaCard for high voltage MultiMediaCards and dual voltage MultiMediaCards.

The first seven bits [6:0] of the OCR belong to a field which is reserved for later use. The same default value of seven '0' bits is used in this field as entry for both, high voltage MultiMediaCards and dual voltage MultiMediaCards.

The OCR further comprises a field with one bit [7] for a first voltage range between 1.65 V and 1.95 V. High voltage MultiMediaCards do not use this range and have thus an entry of a '0' bit in this field. Dual voltage MultiMediaCards use this range and have thus an entry of a '1' bit in this field.

The OCR further comprises a field with seven bits [14:9] for a second voltage range between 2.0 V and 2.7 V, which is currently used neither by high voltage MultiMediaCards nor by dual voltage MultiMediaCards. Thus, both types of MultiMediaCards have an entry of seven '0' bits in this field.

The OCR further comprises a field with nine bits [23:15] for a third voltage range between 2.7 V and 3.6 V, which is used by both, high voltage MultiMediaCards and dual voltage MultiMediaCards. Thus, both types of MultiMediaCards have an entry of nine '1' bits in this field.

The OCR further comprises a field with additional seven bits [30:24] reserved for later use. The same default value of seven '0' bits is used again in this field for both, high voltage MultiMediaCards and dual voltage MultiMediaCards.

Finally, the OCR comprises a field with a last bit [31] for indicating whether the MultiMediaCard is currently busy, that is, occupied by an initialization and power up process. For both types of MultiMediaCards, a '0' bit is used for indicating that the MultiMediaCard is busy, and a '1' bit for indicating that the busy state is over and that the MultiMediaCard is ready for operation.

Figure 3:
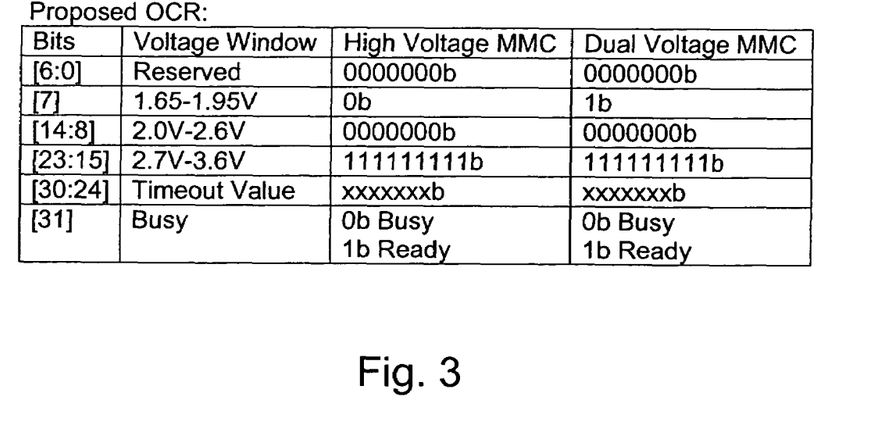
FIG. 3 is a table presenting an OCR for a MultiMediaCard used in the system of FIG. 1.

FIG. 3 is a table illustrating the entries in the OCR 22 of the MultiMediaCard 20 of FIG. 1 for both cases, a high voltage MultiMediaCard and a dual voltage MultiMediaCard.

The fields of the OCR 22 are the same as in FIG. 2, except that the previously reserved field with bits [30:24] is used for storing a timeout value. The timeout value represents the time that the MultiMediaCard 20 in which it is stored requires at the most for an initialization process, that is, its maximum timeout.

With seven bits available, 128 different timeout values can be defined. Advantageously, a value of zero means that a timeout value is not defined and that a maximum timeout of one second shall be assumed. This ensures a backward compatibility with current implementations. Further, the decimal value of the seven bit binary code multiplied with 100 ms could constitute the actual maximum timeout. This would allow a range of 100 ms to 12.7s as maximum timeout.

Obviously, another range could be achieved with another definition. A larger range, for example, would provide even more flexibility, if desired.

The operation of the system of FIG. 1 will now be described with reference to FIG. 4.

Figure 4:
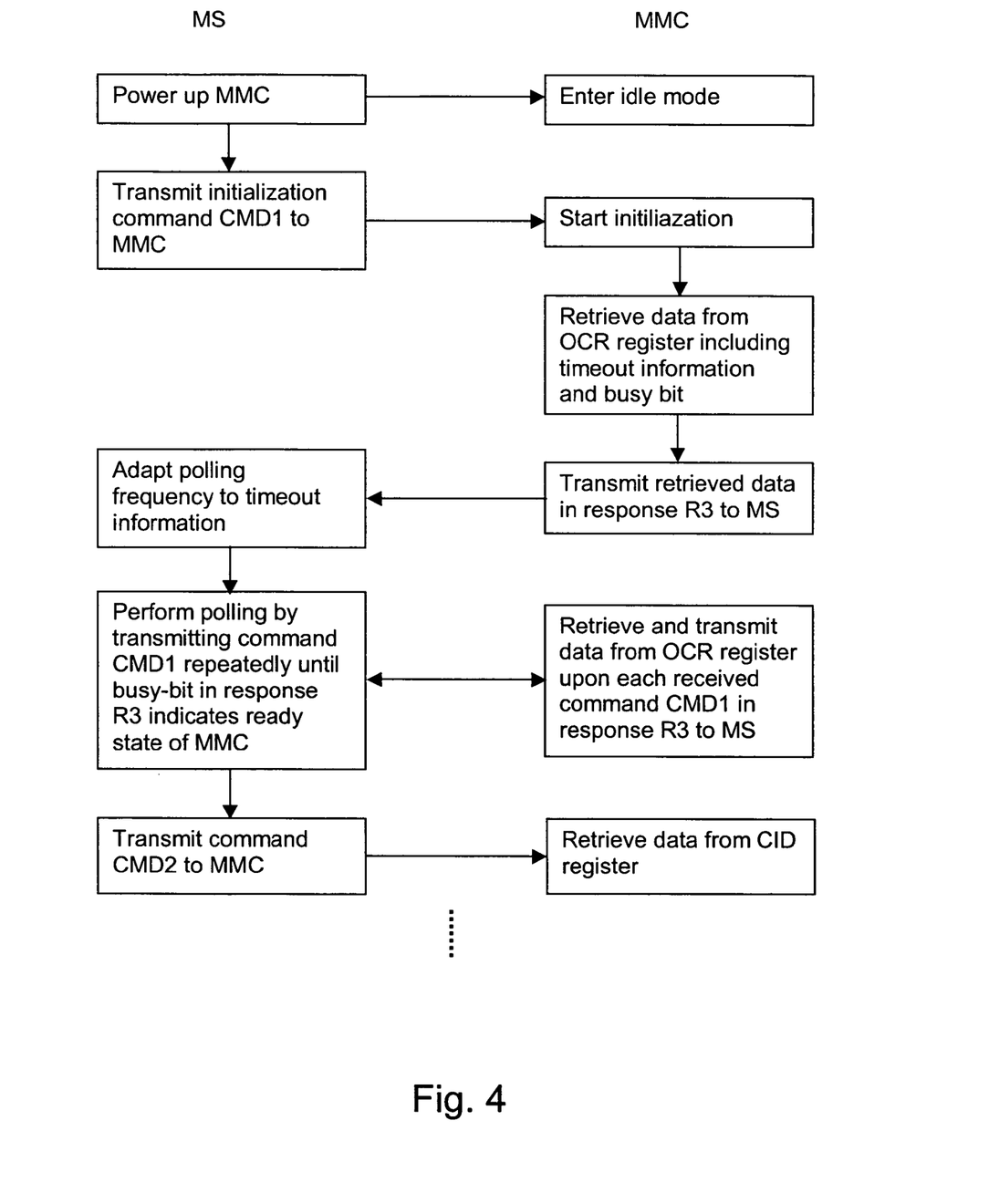
FIG. 4 is a flow chart illustrating the operation of the system of FIG. 1.

FIG. 4 is a flow chart, which presents on the left hand side operations in the mobile station 10 of FIG. 1 and on the right hand side operations in the MultiMediaCard 20 of FIG. 1. It has to be noted that all described control functions of the MMC controller 12 of the mobile station 10 are realized by the software/hardware component 13 and that any signal provided by the MMC controller 12 to the MMC bus 15 is forwarded via interface 14 to the MMC bus 15. Further, all described control functions of the card interface controller 21 of the MultiMediaCard 20 are realized by the software/hardware of the card interface controller 21 and any signal provided by the card interface controller 21 to the MMC bus 15 is forwarded via interface 23 to the MMC bus 15.

When the application 11 of the mobile station 10 wishes to exchange data with a MultiMediaCard 20 connected to the MMC bus 15, it informs the MMC controller 12. The MMC controller 12 thereupon applies a voltage to power lines of the MMC bus 15, thereby switching on the MultiMediaCard 20 and putting it into an idle mode.

Next, the MMC controller 12 transmits an initialization command CMD1 to the MultiMediaCard 20 via a command line CMD of the MMC bus 15. The command CMD1 requests the MultiMediaCard 20 to start an initialization and to transmit the entries of the OCR 22 of the MultiMediaCard 20 to the MMC controller 12.

The card interface controller 21 of the MultiMediaCard 20 reacts to the command CMD1 on the one hand by starting an initialization sequence. On the other hand, the card interface controller 21 retrieves the entries of the OCR 22, including information on the operating voltage, a busy bit and a timeout value. The retrieved entries are then provided by the card interface controller 21 in a response R3 via the CMD line of the MMC bus 15 to the MMC controller 12 of the mobile station 10.

The timeout value received in the response R3 is used by the MMC controller 12 to set a polling frequency. For instance, the shorter the maximum timeout of the MultiMediaCard 20 indicated by the timeout value, the higher the polling frequency is set. If the timeout value indicates a maximum timeout of one second, the polling frequency may be set for instance to once per 200 ms.

The MMC controller 12 then carries out a polling with the set polling frequency for determining when the MultiMediaCard 20 is ready for the actual operation. For the polling, the MMC controller 12 transmits repeatedly the command CMD1 to the MultiMediaCard 20 as long as the busy bit in the preceding response R3 is equal to '0'. When the busy bit has a value of '1', the MultiMediaCard 20 has entered the ready state.

The card interface controller 21 of the MultiMediaCard 20 sets the busy bit in the OCR to '1', as soon as the MultiMediaCard 20 has terminated the initialization. Further, the card interface controller 21 responds to each received command CMD1 of the polling with a response R3 comprising the current entries of the OCR 22.

When the MMC controller 12 receives during the polling a response R3 with a busy bit of '1', indicating that the MultiMediaCard 20 entered the ready state, it continues the process by sending a command CMD2 on the CMD line of the MMC bus 15, which requests the card interface controller 21 of the MultiMediaCard 20 to read a CID register and to transmit the entries back to the MMC controller 12. The process is then continued as known from the state of the art.

Due to the adaptation of the polling frequency to the maximum timeout, the MMC controller 12 can detect at a particularly early point of time whether a MultiMediaCard 20 having a small maximum timeout is ready. At the same time, it is avoided that the MMC controller 12 is burdened with a frequent polling in the case of a MultiMediaCard 20 having a high maximum timeout. Moreover, even a MultiMediaCard 20 having a maximum timeout which is higher than some fixed value of, for example, one second can be employed without additional arrangements.

Figure 5:
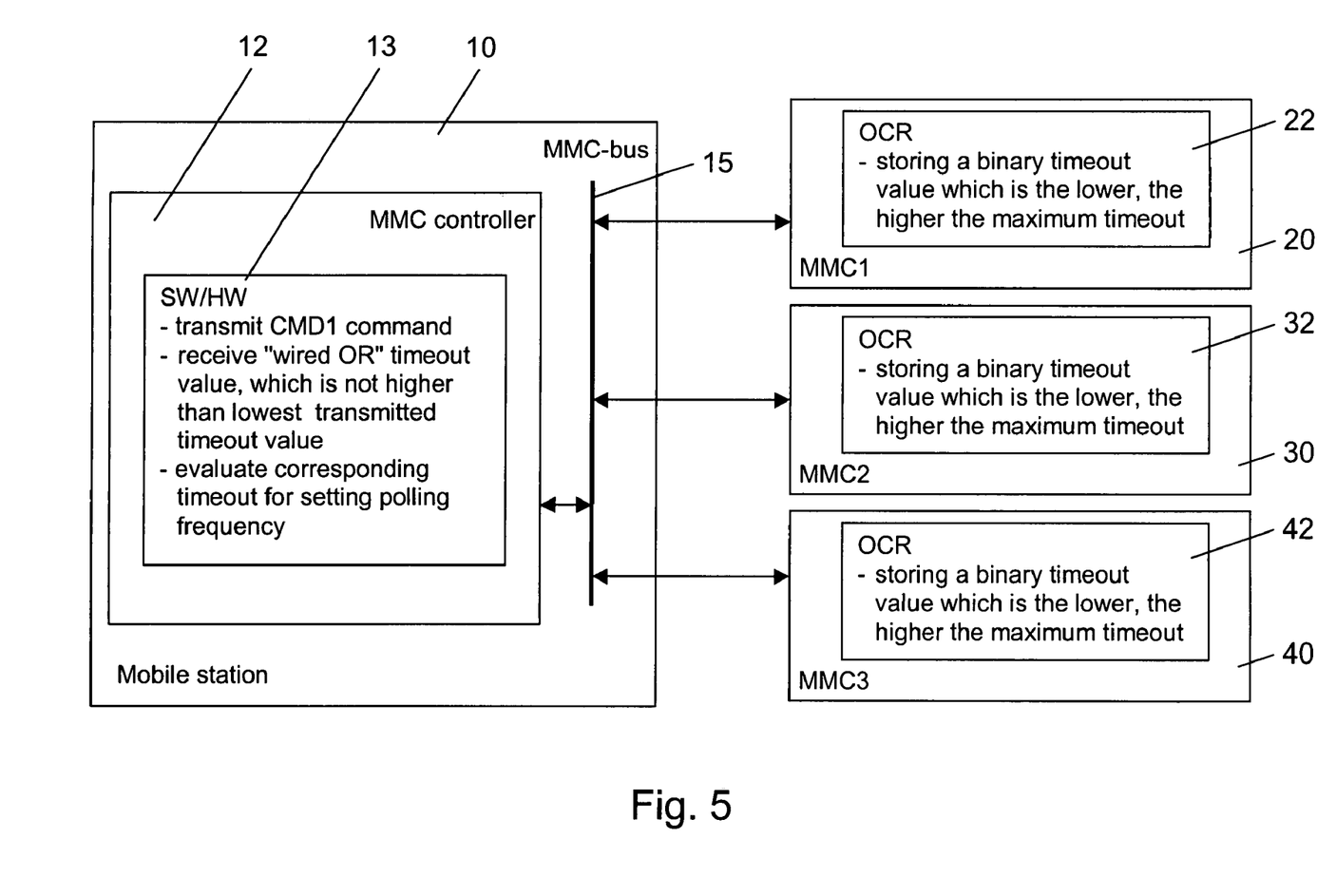
FIG. 5 is a simplified block diagram illustrating a variation of the system of FIG. 1.

The MMC bus 15 of the mobile station 10 of FIG. 1 allows a plurality of MultiMediaCards to be connected simultaneously to the mobile station 10 as well, as indicated in FIG. 5. FIG. 5 is a system which corresponds basically to the system of FIG. 1, in which three MultiMediaCards 20, 30, 40 are connected to the MMC bus 15 of the mobile station 10. The components of the MultiMediaCards 20, 30, 40 and the components of the mobile station 10 correspond basically to the components of the MultiMediaCard 10 and of the mobile station 10, respectively, presented in FIG. 1. Most of the components are therefore not included again in FIG. 5. Of the MultiMediaCards 20, 30, 40, only a respective OCR register 22, 32, 42 is shown, and of the mobile station 10, only the MMC bus 15 and the hardware and/or software 13 of the MMC controller 12 are shown. The OCR registers 22, 32, 42, the MMC bus 15 and the hardware and/or software 13 are connected to the other components of the system in the same way as shown in FIG. 1.

In the system of FIG. 5, the initialization phase of all connected MultiMediaCards 20, 30, 40 is dealt with in common by the mobile station 10. Therefore, it should be ensured that the maximum timeout which is used as basis for selecting the polling frequency is suited for the MultiMediaCard 20, 30, 40 having the longest maximum timeout.

During the initialization phase, an MMC bus 15 works in an open drain mode, that is, all connected MultiMediaCards 20, 30, 40 are transmitting data simultaneously to the mobile station 10. The R3 responses of the MultiMediaCards 20, 30, 40 to an CMD1 command are received by the mobile station 10 as "wired OR". This implies that if one of the MultiMediaCards 20, 30, 40 transmits a "0" bit in the section of its R3 response comprising bits [30:24] and thus the timeout value, this "0" bit will override any "1" bit at the corresponding position of an R3 response by any other connected MultiMediaCard 20, 30, 40.

In the system of FIG. 5, the coding of the timeout values is therefore selected such that a longer maximum timeout of a respective MultiMediaCard is represented by a smaller decimal value. A longer maximum timeout will thus have more zero bits at the most significant bit positions. If there are several MultiMediaCards 20, 30, 40 or other peripheral devices transmitting their own timeout value simultaneously to the mobile station 10, the result received by the hardware and/or software 13 of the MMC controller 12 of the mobile station 10 will then correspond at the most to the lowest timeout value transmitted by any of the connected devices 20, 30, 40.

Accordingly, the maximum timeout registered by the hardware and/or software 13 of the MMC controller 12 will be at least as high as the highest maximum timeout required by any of the connected devices 20, 30, 40. It may even be higher, but it is ensured that it will never be lower than the highest maximum timeout.

The further details of the operation in the system of FIG. 5 correspond exactly to the details of the operation in the system of FIG. 1 described with reference to FIG. 4.

While there have been shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method comprising:
    transmitting information indicative of a time required for an initialization of a respective one of at least two peripheral devices from each of said at least two peripheral devices to a host device;
    electrically combining said information from each of said at least two peripheral devices by means of a bus to produce combined information indicating a time which is required at the most by any of said at least two peripheral devices for its respective initialization; and
    using said combined information for determining when at least one of the at least two peripheral devices is ready for operation after completion of an initialization of each of said at least two peripheral devices.

2. The method according to claim 1, wherein said information indicative of said time required for said initialization of said respective one of said at least two peripheral devices is an information indicative of said time required for said initialization of said respective one of said at least two peripheral devices at a maximum under regular circumstances.

3. The method according to claim 1, wherein at least one of said at least two peripheral devices transmits said information to said host device upon a predetermined command received from said host device.

4. The method according to claim 1, wherein said host device uses said common initialization timeout value for adapting a polling frequency which is to be employed for polling at least one of said at least two peripheral devices on whether said at least one peripheral device has completed its respective initialization.

5. The method according to claim 1, wherein at least one of said at least two peripheral devices is a memory card.

6. The method according to claim 1, wherein said method is implemented in a system comprising a media card, a media card controller, and a bus.

7. The method according to claim 6, wherein at least one of said at least two peripheral devices transmits said information to said host device upon receipt of a CMD1 command from said host device.

8. The method according to claim 6, wherein at least one of said at least two peripheral devices retrieves said information from an operating condition register of said at least one peripheral device, which operating condition register stores data and in addition said information.

9. The method according to claim 6, wherein at least one of said at least two peripheral devices transmits said information in an R3 response to said host device, which R3 response includes data and in addition said information.

10. The method according to claim 1, wherein transmitting information indicative of said time required for an initialization of a respective one of said at least two peripheral devices from each of said at least two peripheral devices via a bus to said host device is performed in an open drain mode of said bus.

11. A host device comprising:
    a bus configured to receive from at least two peripheral devices an information indicative of a time required at a respective one of said at least two peripheral devices for its respective initialization and configured to electrically combine said information to produce combined information indicating a time which is required at the most by any of said at least two peripheral devices for its respective initialization;
    an interface configured to interact with at least two peripheral devices via said bus; and
    a control component configured to receive said combined information via said interface from said bus and to use said combined information for determining when at least one of the at least two peripheral devices is ready for operation after completion of an initialization of each of said at least two peripheral devices.

12. A system comprising a host device and at least two peripheral devices,
    each of said at least two peripheral devices including:
    a first interface configured to interact with said host device;
    a storing component configured to store information indicative of a time required at a respective peripheral device for a respective initialization; and
    a controlling component configured to retrieve information indicative of said time required at said respective peripheral device for said respective initialization from said storing component and configured to transmit said information via said first interface to said host device;
    and said host device including:
    a bus configured to receive from said at least two peripheral devices said information indicative of said time required at said respective peripheral device for its respective initialization and configured to electrically combine said information to produce combined information indicating a time which is required at the most by any of said at least two peripheral devices for its respective initialization;
    a second interface configured to interact with said at least two peripheral devices via said bus; and
    a control component configured to receive said combined information via said second interface from said bus and to use said combined information for determining when at least one of the at least two peripheral devices is ready for operation after completion of an initialization of each of said at least two peripheral devices.

13. An apparatus comprising:
    a bus configured to electrically combine information indicative of a time required for an initialization of a respective one of at least two peripheral devices from each of said at least two peripheral devices to produce combined information indicating a time which is required at the most by any of said at least two peripheral devices for its respective initialization; and a control component configured to use said combined information for determining when at least one of the at least two peripheral devices is ready for operation after completion of an initialization of each of said at least two peripheral devices.

14. The apparatus of claim 13, further comprising:

a control module configured to provide a predetermined command for transmission to at least one of said at least two peripheral devices.

15. An apparatus comprising:

means for electrically combining information indicative of a time required for an initialization of a respective one of at least two peripheral devices from each of said at least two peripheral devices to produce combined information indicating a time which is required at the most by any of said at least two peripheral devices for its respective initialization; and means for using said combined information determining when at least one of the at least two peripheral devices is ready for operation after completion of an initialization of each of said at least two peripheral devices.

16. The apparatus of claim 15, further comprising:

means for providing a predetermined command for transmission to at least one of said at least two peripheral devices.

* * * * *